United States Patent [19]

Kato et al.

[11] Patent Number: 4,756,614

[45] Date of Patent: Jul. 12, 1988

[54] FILM PROJECTOR TOY

[75] Inventors: Yuji Kato; Kazuhiko Mitsumoto; Yasuji Shindo; Michihiro Kozuka; Hiroshi Sano, all of Tokyo, Japan

[73] Assignee: Tomy Kogyo Co., Inc., Tokyo, Japan

[21] Appl. No.: 38,306

[22] Filed: Apr. 14, 1987

[30] Foreign Application Priority Data

Apr. 24, 1986 [JP] Japan ............................ 61-61991[U]
Jul. 17, 1986 [JP] Japan ........................... 61-109546[U]

[51] Int. Cl.$^4$ ............................................. G03B 23/10
[52] U.S. Cl. ...................................... 353/35; 353/110; 353/43
[58] Field of Search ................ 353/110, 43, 30, 35, 353/36, 37, 15–19; 352/87, 102

[56] References Cited

U.S. PATENT DOCUMENTS 1,110,247  9/1914  Whitehead ......................... 353/110
2,488,955 11/1949  Wood .................................. 353/35
2,846,921  8/1958  Glass et al. .......................... 353/35

FOREIGN PATENT DOCUMENTS 452939   9/1936  United Kingdom .
1536328 12/1978  United Kingdom .
1534490 12/1978  United Kingdom .

Primary Examiner—Harry N. Haroian
Attorney, Agent, or Firm—Staas & Halsey

[57] ABSTRACT

A film projector toy is described, including a projector casing and a film cassette received by the casing. The film cassette includes a plurality of films movable one relative to another. Indicia representing different portions of a complete, predetermined picture image are illustrated on each film and the films are superimposed in the cassette. The indicia are then projected, for example, on a wall, so as to form the complete picture image. At least one film is then moved relative to the other films so that the indicia are moved, thereby creating a moving picture image.

4 Claims, 5 Drawing Sheets

FILM PROJECTOR TOY

BACKGROUND OF THE INVENTION

The present invention relates to film projectors and, more particularly, to a film projector toy capable of producing a moving picture image.

Light emitting film projector toys are known wherein a single disc having a plurality of complete picture images thereon can be rotated to project any one of the picture images on a wall. With this conventional film projector toy, the user's interest quickly lessens after seeing each picture image, which detracts from the amusement value of the toy.

SUMMARY OF THE INVENTION

It is an object of the present invention to provide a film projector toy which heightens the user's interest as the toy is used.

It is another object of the present invention to provide a film projector toy capable of producing a picture image whose parts can be moved at the whim of the user to create many different picture images.

It is still another object of the present invention to provide a low-cost and easy to use film projector toy which does not require any expensive or complicated equipment to produce a moving picture image.

To achieve the foregoing and other objects of the present invention and in accordance with the purposes of the invention, there is provided a film projector toy including a light emitting projector casing and a film cassette which is movably received by the casing. The film cassette includes a plurality of superimposed separate films. Each film includes at least one indicia depicting a portion of a complete, predetermined picture image, such that the superimposition of the films forms the complete predeteremined picture image which can be projected, for example, on a wall. Thereafter, at least one of the films is moved relative to the other films to make the various indicia move, thereby creating a complete picture image with moving portions.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A first embodiment of the film projector toy according to the present invention will now be described with reference to FIGS. 1-4.

Figure 1:
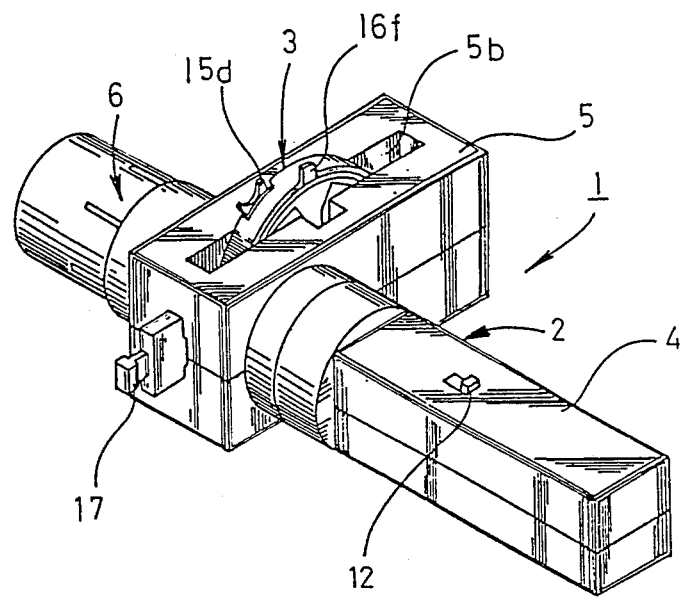
FIG. 1 is a perspective view of one embodiment of the film projector toy according to the present invention.

As seen in FIG. 1, reference numeral 1 denotes a film projector toy generally including a projector housing or casing 2 and a film cassette 3 movably received by the projector casing 2. As can be seen, the film projector toy 1 is designed to be relatively simple and portable.

The projector casing 2 includes an essentially rectangular parallelepiped holding portion 4, a cassette setting section 5, in which the film cassette 3 is placed, and a zoom lens holder 6 which is used to bring the picture image into focus.

Figure 2:
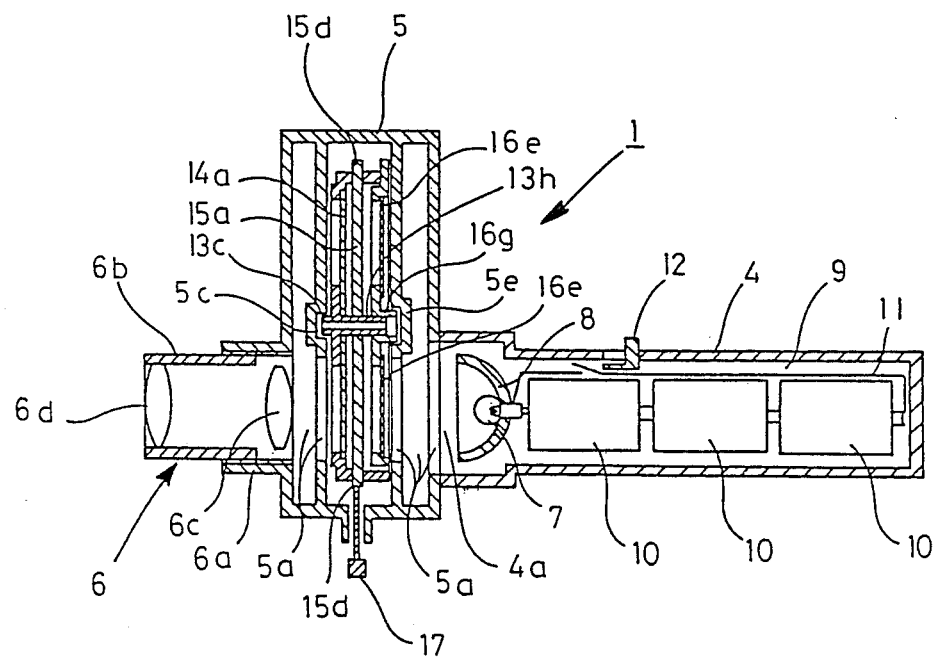
FIG. 2 is a left side, cross-sectional view of the film projector toy shown in FIG. 1.

As best seen in FIGS. 1 and 2, a first end of the holding portion 4 includes an electric bulb 7, a reflecting plate 8 and an opening 4a, so that light can be emitted toward the cassette setting section 5. In addition, a dry cell holder 9, in which dry cells 10 are arranged in series, is provided between the first and second ends of the holding portion 4. The electric power of the dry cells 10 is supplied to the electric bulb 7 by a conventional wiring 11 and power switch 12 combination.

One side wall of the essentially rectangular parallelepiped cassette setting section 5 is provided perpendicular to the axis of the holding portion 4. This cassette setting section 5 is provided with a through opening 5a opposite the opening 4a through which the light emitted from the electric bulb 7 passes. A recess 5b for inserting the film cassette 3 in the cassette setting section 5 is also provided on the upper surface thereof.

Figure 3:
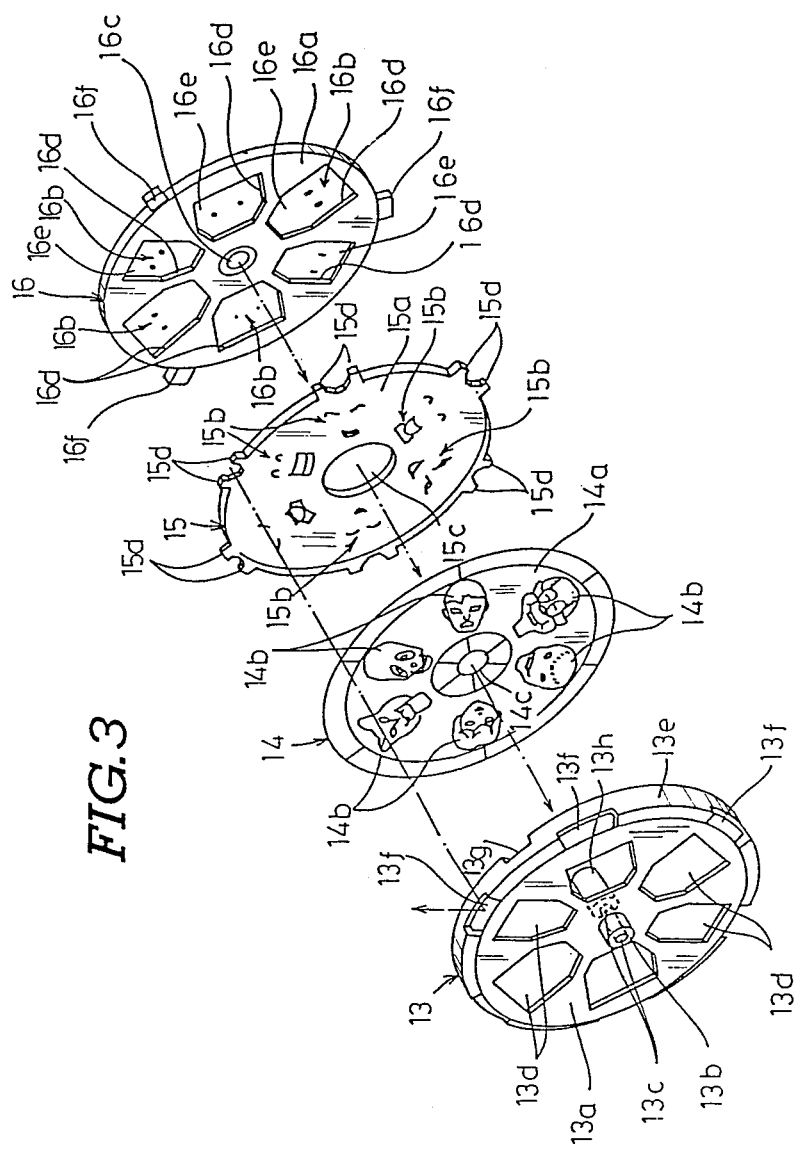
FIG. 3 is an exploded perspective view of one embodiment of the film cassette according to the present invention.

As best seen in FIG. 3, the film cassette 3 includes a disc-like cassette frame 13 and a plurality of disc-shaped film units. In this embodiment, the number of film units is three: 14, 15 and 16. Shafts 13b and 13h are integrally formed at the front and back center of a plate 13a of the cassette frame 13. Cylindrical openings 13c, each having substantially similar diameters as the shafts 13b and 13h, are provided in communication with each other. In addition, the plate 13a is provided with radial openings 13d at predetermined spacing about the shaft 13b.

A circular, transparent, resin film 14a is concentrically attached to the film unit 14 and an opening 14c is provided at the center thereof. First indicia 14b, which represent, e.g., human faces including hair and noses, are radially illustrated on the film 14a at places corresponding to the openings 13d in the cassette frame 13. Animal faces or the like can also be depicted.

The diameter of the similarly circular film unit 15 is approximately equal to that of the film unit 14. A circular transparent resin film 15a is attached to the film unit 15. An opening 15c, the diameter of which is larger than that of the shaft 13h, is provided at the center thereof. Second indicia 15b, each having a predetermined shape representing, e.g., eyebrows and mouth, are radially illustrated on the film 15a around the opening 15c so as to correspond to the first indicia 14b of the film unit 14, respectively. Although the second indicia 15b is described as including two face elements such as eyebrows and a mouth, it is possible to divide these elements by adding another film unit so that each represents one face element.

First operating pieces 15d protrude from the edge of the film unit 15. Furthermore, first operating openings 13f, into which the first operating pieces 15d are inserted are provided on a perpendicular, circumferential wall 13e of the cassette frame 13. In addition, cutouts 13g are provided at three predetermined positions on the frame 13.

The diameter of the film unit 16 is approximately equal to that of the film units 14 and 15. An opening 16c is provided at the center thereof. A disc 16a is provided with through openings 16d, which have the same shapes and are located at the same respective positions as the openings 13d. A transparent film 16e is arranged behind the through openings 16d, respectively. Alternatively, separate films 16e can be arranged at each through opening 16d. Third indicia 16b, such as eyes, are illustrated on the transparent film 16e to correspond to the first indicia 14b. In addition, second operating pieces 16f, which engage the cutouts 13g of the cassette frame 13, are provided at three predetermined positions on the edge of the disc 16a. Furthermore, the size of the opening 16c of the disc 16a is such that it is engagable with the shaft 13h of the cassette frame 13 with a little play therebetween. In addition, projections 16g (see FIG. 2) are provided opposite the side where the shaft 13h is inserted into the opening 16c when the film cassette 3 is inserted.

The procedure for assembling the film cassette 3 having the aforementioned construction is described below.

First, the film unit 14 is housed in the cassette frame 13 so that the shaft 13h engages the opening 14c. The film unit 14 is oriented relative to the cassette frame 13 so that each first indicia 14b corresponds to each position of the openings 13d.

Secondly, the film unit 15 is housed in the cassette frame 13 so that the shaft 13h engages the opening 15c. In this case, the first operating pieces 15d of the film unit 15 protrude through the first operating openings 13f of the cassette 13, respectively. In this condition, the film unit 15 is movable up and down within a predetermined range since the diameter of the opening 15c is larger than that of the shaft 13h.

In addition, the film unit 16 is housed in the cassette frame 13 so as to allow the shaft 13h of the cassette frame 13 to engage the opening 16c. In this case, the second operating pieces 16f are received by the cutouts 13g of the cassette frame 13, to complete assembly of the film cassette 3.

As also shown in FIG. 2, the cassette setting section 5 is provided with portions 5c and 5e which support the shafts 13b and 13h of the film cassette 3 so that the film cassette 3 is rotatable in the inserting recess 5b.

Furthermore, numeral 17 denotes a control lever provided on the side wall of the cassette setting section 5. The first operating pieces 15d of the film cassette 3 positioned within the inserting recess 5b can be inserted into and removed from the first operating openings 13f of the cassette frame 13 by means of the control lever 17 so that the film unit 15 can be moved relative to the film units 14 and 16.

The zoom lens holder 6 is provided on the side wall of the cassette setting section 5 across from the through opening 5a of the cassette setting section 5 in the light emitting direction. The zoom lens holder 6 includes: a fixed cylindrical frame 6a which is integral with the cassette setting section 5 and which is disposed on the front edge of the through opening 5a; a cylindrical frame 6b movably mounted within the fixed cylindrical frame 6a; a lens 6c fixed relative to the cylindrical frame 6a; and a lens 6d movable with the cylindrical frame 6b. In this construction, the picture image can be brought into focus by rotating and adjusting the movable cylindrical frame 6b.

The method for operating the film projector toy 1 of the first embodiment according to the present invention will now be described.

First, the film cassette 3 is inserted into the cassette setting section 5 of the projector casing 2. As a result, the first indicia 14b provided at the predetermined openings 13d are disposed within the through opening 5a. Second, the power switch 12 is closed, a complete picture image made up of corresponding first, second and third indicia is projected on a screen, wall, or the like, and the picture image is brought into focus by moving the zoom lens holder 6 toward or away from the cassette setting section 5. The appearance of the picture image can then be changed by manually operating the control lever 17 and the second operating pieces 16f. That is, the first operating pieces 15d are made to move up and down by operating the control lever 17 which causes the second indicia of eyebrows and mouth to move relative to the first indicia, i.e., face. Further, manually moving the second operating pieces up and down causes the third indicia 16b, i.e., eyes, to move, also relative to the first indicia. Therefore, the complete, composite picture image projected on a screen or wall can represent a variable facial expression.

Furthermore, other first indicia 14b can be substituted for the first indicia 14b, by manually rotating the entire cassette frame 13. As would be understood in the art, it is possible to provide proper stopping means so as to maintain each first indicia 14b at a predetermined position of the through opening 5a.

Figure 4:
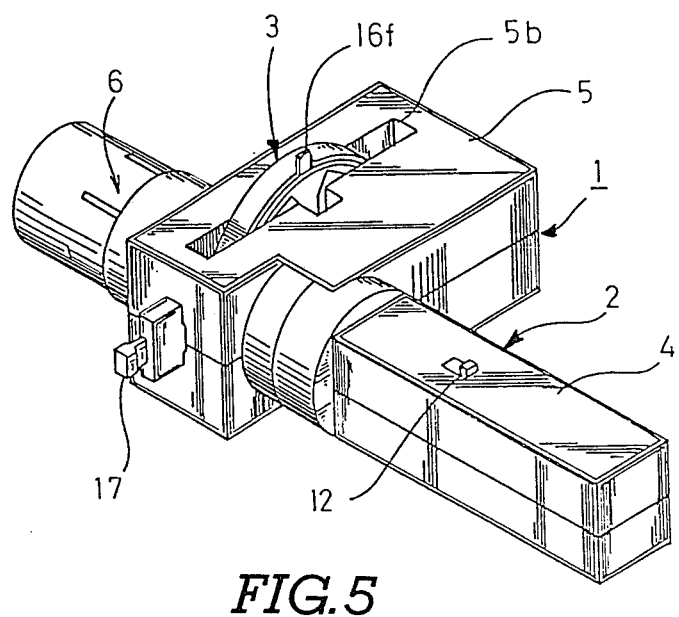
FIG. 4 is a perspective view of a second embodiment of the film projector toy according to the present invention.

A second embodiment of the film projector toy according to the present invention will now be described with reference to FIGS. 4 to 6, using similar reference numerals to depict similar members.

In this alternate embodiment, only two film units 14 and 16 are used, as opposed to the three described for the first embodiment.

The film unit 14 is provided with a plurality of openings 14e, which engage a corresponding plurality of projections 13i formed on the plate 13a. In addition, first indicia 14b, again representing e.g., human faces, are illustrated on the film 14a.

The film unit 16 is provided with: a plurality of ribs 16h eminating from an opening 15c; a plurality of projections 16i provided on the surface of particular ribs 16h which are received by a plurality of openings (not shown) formed on the back of the film 14; and a film 15a having a plurality of openings (now shown) provided at positions corresponding to the projections 16i. This construction facilitates the positioning of the film unit 16 relative to the film 15a. Second indicia 15b representing predetermined shapes of eyebrows, mouths, and the like, as well as third indicia 16b representing, e.g., eyes, are printed on the film 15a radially about the opening 15c.

As described above, in the first embodiment the first operating pieces 15d are moved by operating the control lever 17 to move only the second indicia of eyebrows and mouth. In contrast the second embodiment provides that when the second operating pieces 16f are moved via the control lever 17, the second and third indicia of eyebrows, mouth and eyes are moved at the same time. With the film cassette 3 of the second embodiment, it is possible to make assembly and operation easier and to lower manufacturing costs.

Figure 5:
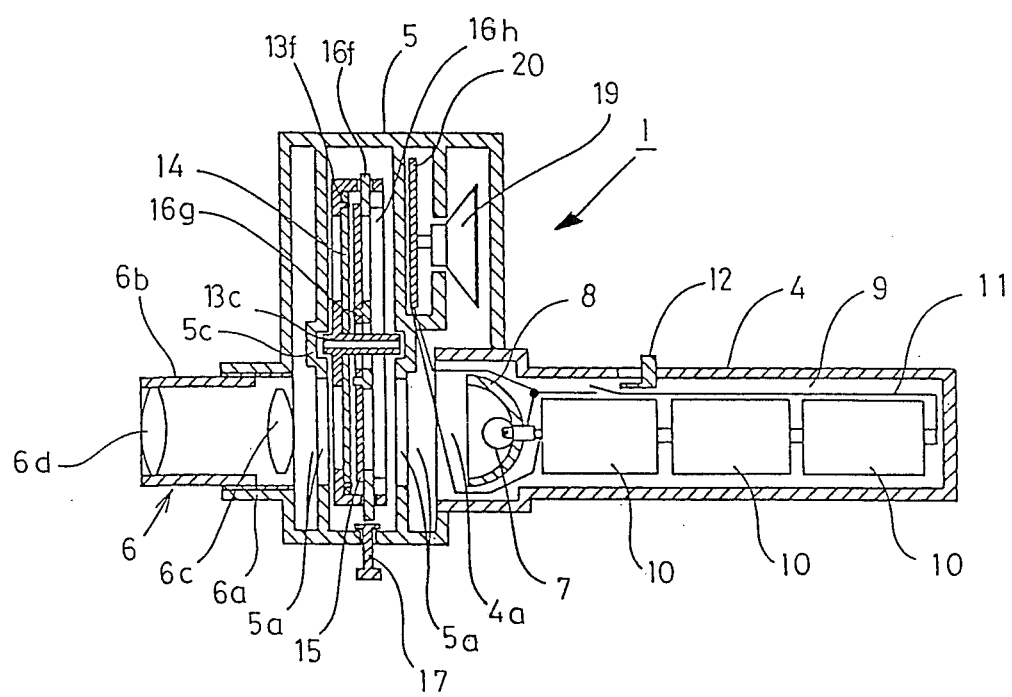
FIG. 5 is a left side, cross-sectional view of the toy film projector shown in FIG. 4.
Figure 6:
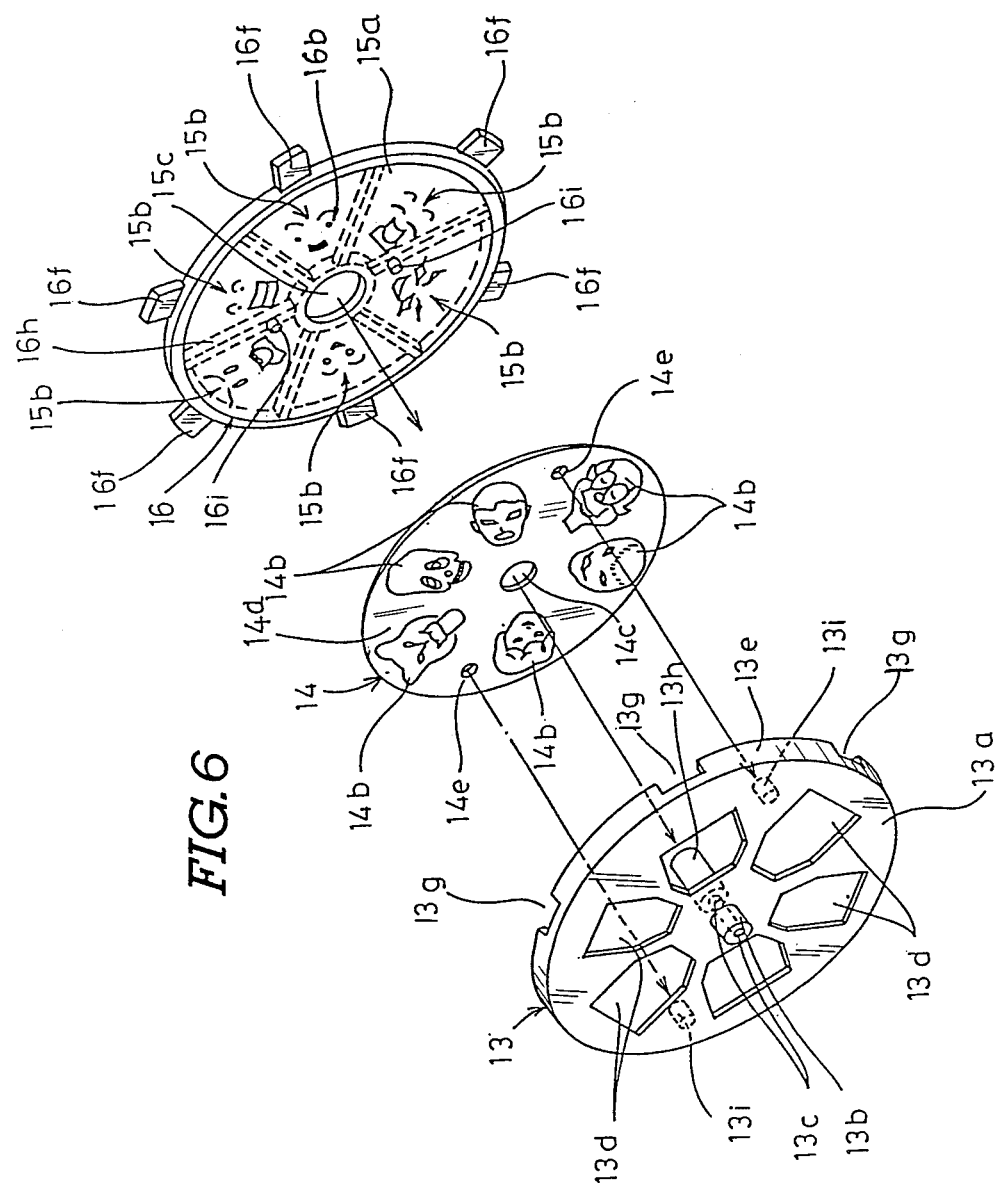
FIG. 6 is an exploded perspective view of a second embodiment of the film cassette of the second embodiment.

Furthermore, as shown in FIG. 5, the film projector toy according to this second embodiment can be provided with a sound producing device including a speaker 19 and a substrate 20 connected between the speaker 19 and the power switch 12. As a result, it is possible to produce sound effects by means of the speaker, as the picture image is projected.

Figure 7:
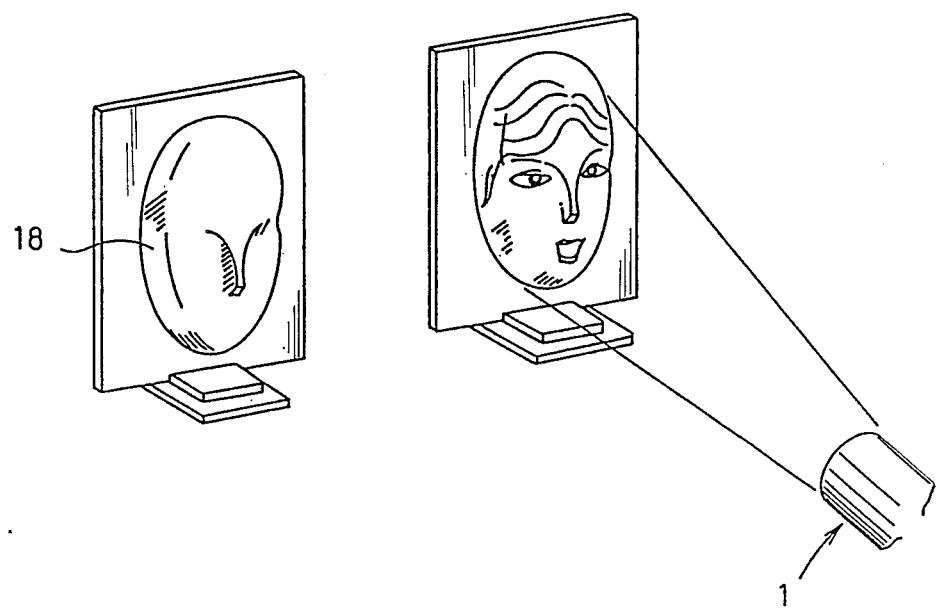
FIG. 7 is a perspective view showing an example of use of the film projector toy according to the present invention.

FIG. 7 shows an example of use of the film projector toy according to either embodiment of the invention. In accordance with the example in FIG. 7, it is possible to project a complete picture image from the film projector toy 1 on a model 18, on which an outline of the front half of a human face is formed, but not the eyes, mouth, eyebrows, and the like. In this way, a three-dimensional picture image, such as a face of an actual human being, can be created and varied.

Although each of the complete picture images described above is described as the face of a human being, animal, or the like, aliens, robots, vehicles, or the like, may also be used. That is, different portions of almost any complete picture image may be illustrated on the films, respectively, as long as the film units can be superimposed to form the picture image. Furthermore, depending on the quantity of indicia required to form a complete picture image, it is possible to increase or decrease the number of the film units required, if necessary.

In addition, although it is described above that a film can be moved relative to the remaining films by manually operating the control lever 17, a thyristor, a motor, or the like, may be used as a powered drive means to automatically move a film.

In addition, although the shape of each film unit 14, 15 and 16 is described as circular in the aforementioned embodiments, the shape may be long and narrow such that the indicia 14b, 15b and 16b are disposed in a straight line in the casing 2.

As described above the present invention allows a plurality of indicia on separate films of a cassette to be superimposed to form a complete, predetermined, projected picture image. It is also possible to move a particular film including particular indicia, such as eyes, independently of the remaining films to create spontaneous animation in an interesting manner. In addition, when a child operates the device, he can easily learn in an interesting manner the portions or actions of an object, such as an animal, vehicle, etc.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention and the appended claims.

We claim:
1. A toy film projector for projecting a complete picture image on a surface, such as a wall, comprising:
    (a) a housing;
    (b) a light source associated with the housing;
    (c) a circular film cassette mountable within the housing, including—
        (i) a frame fully rotatable within the housing and having a plurality of openings formed radially therein, each of said openings selectively being alignable with the light source by rotating the frame,
        (ii) a first film operatively connected for full rotational movement with the frame and having a plurality of first indicia formed radially thereon, each indicia representing a first portion of the complete picture image and being aligned with a corresponding one of the plurality of openings in the frame,
        (iii) a disc operatively connected for full rotational movement with the frame and up and down movement relative to the frame, and
        (iv) a second film operatively connected to the disc for movement therewith, having a plurality of second indicia formed radially thereon, each indicia representing a second portion of the complete picture image, being aligned with a corresponding one of the plurality of openings in the frame and being superimposed relative to a corresponding one of the plurality of first indicia; and
    (d) means mounted on the housing for moving the disc including the second film up and down relative to the frame including the first film thereby projecting the complete picture image through one of the plurality of openings aligned with the light source, with the corresponding first and second indicia moving relative to each other.

2. The projector as recited in claim 1, wherein the means for moving is manually operated.

3. The projector as recited in claim 1, wherein the means for moving is operated by powered drive means.

4. The projector as recited in claim 1, further comprising means for producing a sound concurrently with projection of the complete picture image.

* * * * *